Patented July 11, 1939

2,165,819

UNITED STATES PATENT OFFICE 2,165,819

ELECTRIC INSULATOR AND METHOD OF MAKING SAME

Ernst Albers-Schönberg, Berlin-Frohnau, Germany, assignor to Steatit-Magnesia Aktiengesellschaft, Berlin-Pankow, Germany No Drawing. Application May 24, 1935, Serial No. 23,326. In Germany June 5, 1934

8 Claims. (Cl. 49—81)

This invention relates to an electric insulator of increased dielectric constant particularly adapted for ceramic condensers and differs from the known inorganic insulating substances produced on a ceramic base by disclosing a low dielectric loss and a high dielectric constant.

The new insulating material consists substantially or partly of magnesium titanate produced by the calcination of a mixture of magnesium oxide and titanium dioxide. Magnesium oxide, when in a free state and not bound to silicic acid, and titanium dioxide enter into combinations with one another during ceramic firing, such as $MgO—TiO_2$; $MgO.2TiO_2$; $2MgO.TiO_2$ and $3MgO—2TiO_2$, which are well known.

Corresponding to their share of titanium dioxide, the dielectric constant of such substances is quite high, and a mass having the stoichiometrical composition $MgO—TiO_2$ contains for instance approximately 33 parts by weight magnesium oxide and approximately 67 parts by weight titanium dioxide, so that the dielectric constant becomes a multiple of that of porcelain. It is, however, not necessary to choose a composition of the mass accurately corresponding to the stoichiometrical compositions of the magnesium titanates, as one of the two components may be present in excess. If the dielectric constant is to be high, excess titanium dioxide is introduced, and in the other case, excess magnesium oxide. It is further possible to introduce natural mineral magnesium titanate into the mass, as long as the natural impurities are within permissible limits.

Magnesium titanate masses composed and produced as described combine great hardness with considerable refractoriness, good insulating capacity even at high temperature, low dielectric loss and increased dielectric constant. A further important feature is that the dependence of the dielectric constant upon temperature remains within very narrow limits.

The mixture of magnesium oxide and titanium dioxide is very little plastic per se, but the ceramic press technique permits considerable forming even of mixtures that are slightly or semi-plastic. If it is absolutely necessary, as for instance in the production of tubes, to work a more plastic mass, greater plasticity can be imparted by carefully adding the smallest possible amount of clay substance, bentonite or another plastic aluminium silicate. Organic auxiliary substances may of course also be added without trouble. The fairly high temperature of formation of the magnesium titanates suggests or sometimes even compels the introduction of fluxes into the batch, preferably alkaline earth compounds, which tend to effect the formation of well crystallizing mixtures of magnesium titanate and calcium titanate or barium titanate.

Titanium dioxide can be introduced as rutile only if the demands as to purity of color and quality of the dielectric properties are quite moderate. Otherwise, a chemically purified and precipitated product should be used which may be employed in crude or preparatorily burnt form. The magnesium oxide, too, may be used in different forms, such as hydroxide, magnesia usta, calcined magnesia, or molten magnesia, such as that known as electric furnace periclase. The crude mass is preferably built up so that both artificially densified and crude loose portions of substance are present in the mixture.

A particularly advantageous use of the insulating material according to the invention refers to the production of bases for electron tubes, since it permits to eliminate the difficulties connected for instance with the proposed use of quartz glass for such bases within which the metal conductors have to be arranged side by side in a relatively small space and which must therefore consist of insulating material that is loss-free to a considerable extent. These difficulties are chiefly due to the great difference in the coefficients of expansion of quartz and metal, which does not permit the vacuum-tight sealing of the leads by simple means.

Bases of the known ceramic materials, preferably magnesium silicate, which have been proposed for the same purpose for the reason stated, possess, on the other hand, not sufficient dielectric merit, especially if the batch of the base material is adapted to the sealing and fusing conditions of usual glasses. Furthermore, a base of magnesium silicate insulating material that is loss-free to a considerable extent requires during the assembling of the tube the use of special glasses whose total qualities are not adapted to the construction of electron tubes.

The ceramic insulating material according to the invention, apart from its high dielectric merit surpassing that of the magnesium silicate substances and approaching that of quartz glass, possesses the property that it can be fused without the least trouble with the lead glasses used in the construction of electron tubes.

The imparting of greater plasticity to the mass is necessary only in case of more difficult forms of bases and can then be effected in the manner fundamentally described above, and fluxes may also be introduced into the batch as described.

I claim:

1. An electric insulator consisting substantially of magnesium titanate in accordance with the formula $2MgO.TiO_2$ and the residue consisting substantially of titanium dioxide.

2. An electric insulator consisting substantially of magnesium titanate in accordance with the formula $2MgO.TiO_2$ and the residue consisting substantially of magnesium oxide.

3. An electric insulator consisting substantially of magnesium titanate with a minor quantity of alkaline earth compounds.

4. The method of making an electric insulator which consists in suitably shaping a mixture consisting essentially of MgO and $TiO_2$ and firing the mixture until the ingredients combine substantially as magnesium titanate.

5. The method of making an electric insulator which consists in suitably shaping a mixture consisting essentially of fused magnesia and calcined titanium dioxide and firing the mixture until the ingredients combine substantially as magnesium titanate.

6. The method of making an electric insulator which consists in suitably shaping a mixture consisting essentially of the ingredients of magnesium titanate with a minor amount of alkaline earth compounds and firing the mixture until the ingredients combine substantially as magnesium titanate.

7. A composite body consisting in part of a glass member and in part of a member of magnesium titanate, said members being fusion-welded to one another.

8. A composite body comprising a glass member and a member composed of a ceramic material having as main components magnesium oxide and titanium oxide, said members being fusion-welded to one another.

ERNST ALBERS-SCHÖNBERG.